United States Patent
Baudisch et al.

(10) Patent No.: US 7,730,430 B2
(45) Date of Patent: Jun. 1, 2010

(54) HIGH DENSITY CURSOR SYSTEM AND METHOD

(75) Inventors: Patrick M. Baudisch, Seattle, WA (US); George G. Robertson, Seattle, WA (US); Edward B. Cutrell, Seattle, WA (US)

(73) Assignee: Microsoft Corporation, Redmond, WA (US)

(*) Notice: Subject to any disclaimer, the term of this patent is extended or adjusted under 35 U.S.C. 154(b) by 808 days.

(21) Appl. No.: 10/763,898

(22) Filed: Jan. 23, 2004

(65) Prior Publication Data

US 2004/0150619 A1 Aug. 5, 2004

Related U.S. Application Data

(60) Provisional application No. 60/442,860, filed on Jan. 24, 2003.

(51) Int. Cl.
*G06F 3/048* (2006.01)

(52) U.S. Cl. .................. 715/857; 715/856; 715/858; 345/156; 345/157; 345/159

(58) Field of Classification Search ......... 715/856–862; 345/156, 157, 159
See application file for complete search history.

(56) References Cited

U.S. PATENT DOCUMENTS

| | | | | |
|---|---|---|---|---|
| 4,734,685 A | * | 3/1988 | Watanabe | 345/157 |
| 5,191,641 A | * | 3/1993 | Yamamoto et al. | 345/418 |
| 5,195,179 A | * | 3/1993 | Tokunaga | 345/159 |
| 5,270,688 A | * | 12/1993 | Dawson et al. | 345/639 |
| 5,298,890 A | * | 3/1994 | Kanamaru et al. | 345/157 |
| 5,621,434 A | * | 4/1997 | Marsh | 715/856 |
| 5,633,657 A | * | 5/1997 | Falcon | 345/157 |
| 5,661,502 A | * | 8/1997 | Cheng | 345/159 |

(Continued)

FOREIGN PATENT DOCUMENTS

JP 05073257 A * 3/1993

(Continued)

OTHER PUBLICATIONS

Baudisch, P., et al., "Drag-and-Drop and Drag-and-Pick: Techniques for Accessing Remote Screen Content on Touch- and Pen-Operated Systems," *Proc. Interact*, Zürich, Switzerland, Sep. 1-5, 2003, pp. 57-64.

(Continued)

*Primary Examiner*—Ba Huynh
*Assistant Examiner*—Eric Wiener
(74) *Attorney, Agent, or Firm*—Lee & Hayes, PLLC

(57) ABSTRACT

A method for enhancing a mouse cursor is presented. During the mouse cursor update display cycle, a test on the current mouse speed is made. If the mouse cursor's speed exceeds a predetermined threshold, an enhanced mouse cursor is generated and displayed on the computer screen. According to one embodiment, an enhanced mouse cursor is generated by increasing the size of a standard mouse cursor in proportion to the speed of the mouse cursor. According to an alternative embodiment, an enhanced mouse cursor is generated by interpolating the mouse cursor's path and adding a motion-blur effect along the interpolated path. According to yet another embodiment, an enhanced mouse cursor is generated by interpolating the mouse cursor's path and a plurality of mouse cursor images are displayed along the interpolated path.

12 Claims, 12 Drawing Sheets

U.S. PATENT DOCUMENTS

| | | | | |
|---|---|---|---|---|
| 5,764,219 | A * | 6/1998 | Rutledge et al. | 345/159 |
| 5,933,149 | A * | 8/1999 | Mori et al. | 345/442 |
| 6,025,833 | A * | 2/2000 | Duff | 345/159 |
| 6,040,821 | A * | 3/2000 | Franz et al. | 345/159 |
| 6,064,405 | A * | 5/2000 | Eng et al. | 345/545 |
| 6,181,325 | B1 * | 1/2001 | Lee | 345/157 |
| 6,252,579 | B1 * | 6/2001 | Rosenberg et al. | 715/856 |
| 6,259,432 | B1 * | 7/2001 | Yamada et al. | 345/159 |
| 6,288,705 | B1 * | 9/2001 | Rosenberg et al. | 345/163 |
| 6,392,675 | B1 * | 5/2002 | Becker et al. | 715/858 |
| 6,483,509 | B1 * | 11/2002 | Rabenhorst | 345/442 |
| 6,509,889 | B2 * | 1/2003 | Kamper et al. | 345/157 |
| 6,642,947 | B2 * | 11/2003 | Feierbach | 715/861 |
| 6,650,313 | B2 * | 11/2003 | Levine et al. | 345/156 |
| 6,650,314 | B2 * | 11/2003 | Philipson | 345/157 |
| 6,894,678 | B2 * | 5/2005 | Rosenberg et al. | 345/157 |
| 7,071,919 | B2 * | 7/2006 | Hinckley et al. | 345/163 |

FOREIGN PATENT DOCUMENTS

| | | |
|---|---|---|
| JP | 05265691 A * | 10/1993 |

OTHER PUBLICATIONS

Baudisch, P., et al., "High-Density Cursor: a Visualization Technique That Helps Users Keep Track of Fast-Moving Mouse Cursors," *Proc. Interact*, Zurich, Switzerland, Sep. 1-5, 2003, pp. 236-243.

Baudisch, P., et al., "Keeping Things in Context: a Comparative Evaluation of Focus Plus Context Screens, Overviews, and Zooming," *Proc. CHI*, Minneapolis, Minn., Apr. 20-25, 2002, pp. 259-266.

Bier, E.A. and M.C. Stone, "Snap-Dragging," *Proc. SIGGRAPH*, Aug. 18-22, 1986, Dallas, Texas, pp. 233-240.

Card, S.K., et al., "Information Scent as a Driver of Web Behavior Graphs: Results of a Protocol Analysis Method for Web Usability," *Proc. CHI*, Seattle, Wash., Mar. 31-Apr. 5, 2001, vol. 3, Issue No. 1, pp. 498-505.

Chang, B.-W., and D. Ungar, "Animation: From Cartoons to the User Interface," *Proc. UIST*, Nov. 3-5, 1993 Atlanta, Ga., pp. 45-55.

Conner, B. and L. Holden, "Providing a Low Latency User Experience in a High Latency Application," *Symposium on Interactive 3D Graphics*, Providence, Rhode Island, Apr. 27-30, 1997, pp. 45-48.

Cook, R.L., et al., "Distributed Ray Tracing," *Computer Graphics* 18(3):137-145, Jul. 1984.

Czerwinski, M., et al., "Women Take a Wider View," *Proc. CHI*, Minneapolis, Minn., Apr. 20-25, 2002, pp. 195-202.

Dachille IX, F. And Kaufman, A. "High-Degree Temporal Antialiasing," *Proc. Computer Animation*, Philadelphia, Pa., May 3-5, 2000, pp. 49-54.

Douglas, et al., "Testing Pointing Device Performance and User Assessment With the ISO 9241, Part 9 Standard," *Proc. CHI*, Pittsburgh, Pa., 1999, pp. 215-222.

Dulberg, M.S., et al., "An Imprecise Mouse Gesture for the Fast Activation of Controls," *Proc. Interact*, Edinburgh, Scotland, Sep. 1999, pp. 1-10.

Geissler, J., "Shuffle, Throw or Take It! Working Efficiently With an Interactive Wall," *Proc. CHI Summary*, Los Angeles, Calif., Apr. 18-23, 1998, pp. 265-266.

Grudin, J., "Partitioning Digital Worlds: Focal and Peripheral Awareness in Multiple Monitor Use," *Proc. CHI*, Seattle, Wash., Mar. 31-Apr. 5, 2001, pp. 458-465.

Gutwin, C., "Improving Focus Targeting in Interactive Fisheye Views," *Proc. CHI*, Minneapolis, Minn., Apr. 20-25, 2002, pp. 267-274.

Igarashi, T., et al., "Interactive Beautification: a Technique for Rapid Geometric Design," *Proc. UIST*, Banff, Canada, Oct. 14-17, 1997, pp. 105-114.

Kensington MouseWorks Software 5.61, Kensington Technology Group, <http://www.download.com/Kensington-MouseWorks-Software/3000-2110_4-10160527.html?tag=foot_pub> [retrieved Sep. 22, 2005], at least as early as Oct. 18, 2002.

MacKenzie, I.S., "Fitts' Law as a Research and Design Tool in Human-Computer Interaction," *Human-Computer Interaction* 7(1):91-139, 1992.

McGuffin, M., and R. Balakrishnan, "Acquisition of Expanding Targets," *Proc. CHI*, Minneapolis, Minn., Apr. 20-25, 2002, pp. 57-64.

Moyle, M., and A. Cockburn, "Analysing Mouse and Pen Flick Gestures," *Proc. of the SIGCHI-NZ Symposium on Computer-Human Interaction*, Hamilton, New Zealand, Jul. 11-12, 2002, pp. 67-64.

Sibert, L.E., and R.J.K. Jacob, "Evaluation of Eye Gaze Interaction," *Proc. CHI*, The Hague, The Netherlands, Apr. 1-6, 2000, pp. 281-288.

Swaminathan, K. and S. Sato, "Interaction Design for Large Displays," *Interactions* 4(1):15-24, Jan.-Feb. 1997.

Thomas, B.H. and P.R. Calder, "Applying Cartoon Animation Techniques to Graphical User Interfaces," *ACM Transactions of Computer-Human Interactions* 8(3):198-222, Sep. 2001.

Zhai, S., et al., "Manual and Gaze Input Cascaded (MAGIC) Pointing," *Proc. CHI*, Pittsburgh, Pa., May 15-20, 1999, pp. 246-253.

* cited by examiner

HIGH DENSITY CURSOR SYSTEM AND METHOD

CROSS-REFERENCE TO RELATED APPLICATION

This application claims the benefit of U.S. Provisional Application No. 60/442,860, filed Jan. 24, 2003.

FIELD OF THE INVENTION

The present invention relates to a method for providing an improved cursor display when the cursor is moved quickly on a computer displayed user interface.

BACKGROUND OF THE INVENTION

In recent years, worldwide use of computers has increased dramatically. Computer application programs ("applications" or "apps") are used for a variety of purposes, including word processing, accounting, database management, desktop publishing, communications, and the like. The efficiency of computer utilization is improved by allowing a user to easily access a variety of different programs directed to accomplishing tasks and fulfilling the various goals of the user. For example, a user might make regular and extensive use of a word processing program, an e-mail program, a spreadsheet program, and a personal information manager, which are all separate display objects in the computer display or displays. Rather than have all these programs present on the same part of the screen, the user may place the display objects in different locations on the computer display.

When moving between the various windows on a computer display the user may often lose track of the mouse cursor due to the high speeds and long distances the mouse cursor may move. More particularly, when a mouse cursor is moved at high speeds over long distances, the mouse cursor is not updated at a high enough rate on the computer display, thus leaving substantial gaps between individual appearances of the mouse cursor. These gaps visually disrupt the continuity of the path of the mouse cursor on the display screen. As a result of this lack of visual continuity, it is harder for users to visually keep track of the mouse cursor.

FIG. 1 is a pictorial diagram of an exemplary view 100 for illustrating the gaps that occur between the periodic appearances of the mouse cursor as the speed of the mouse cursor increases, as found in the prior art. For purposes of understanding FIG. 1, as well as FIGS. 5, 10, and 11, the view 100 shows a mouse cursor moving from the left hand side of the view to the right hand side of the view as the speed of the mouse cursor increases. The frame indicators on the bottom of the view indicate the periodic update mouse cursor display cycles. Thus, as can be seen in this exemplary view 100, as the mouse cursor increases in speed, the gaps between individual appearances of the mouse cursor also increase, as indicated by gaps 102, 104, 106, and 108.

To address the visual discontinuity in mouse cursor display, some operating systems allow a user to customize the mouse cursor to keep a "tail" of displayed mouse cursors for a longer period of time thereby creating a path to visually follow, but such paths cause a lag when trying to locate the mouse cursor. For example, while tails allow a user to follow the mouse cursor's path, the user does not find the actual mouse cursor's position until the tail catches up after a delay.

Therefore, a need exists for a new and improved method for assisting users in locating mouse cursors in a large desktop environment in a way that improves the user's ability to locate the mouse cursor in a more immediate manner.

SUMMARY OF THE INVENTION

A method and computer-readable medium bearing computer-readable instructions for enhancing the mouse cursor displayed on a computer display is presented. The current mouse cursor speed is obtained and a determination is made as to whether the current mouse cursor speed exceeds a predetermined threshold. If the current mouse speed exceeds the predetermined threshold, an enhanced mouse cursor is generated and displayed on the computer display.

According to alternative aspects of the present invention, an alternative method for enhancing a mouse cursor displayed on a computer display is presented. Mouse cursor information is obtained during the mouse cursor's update display cycle. The mouse cursor information includes the mouse cursor's current speed. Thereafter, a displayable mouse cursor is generated according to the mouse cursor's current speed, and displayed on the computer display.

BRIEF DESCRIPTION OF THE DRAWINGS

Many of the advantages of this invention will become more readily appreciated as the same become better understood by reference to the following detailed description, when taken in conjunction with the accompanying drawings, wherein.

DETAILED DESCRIPTION

Figure 1:
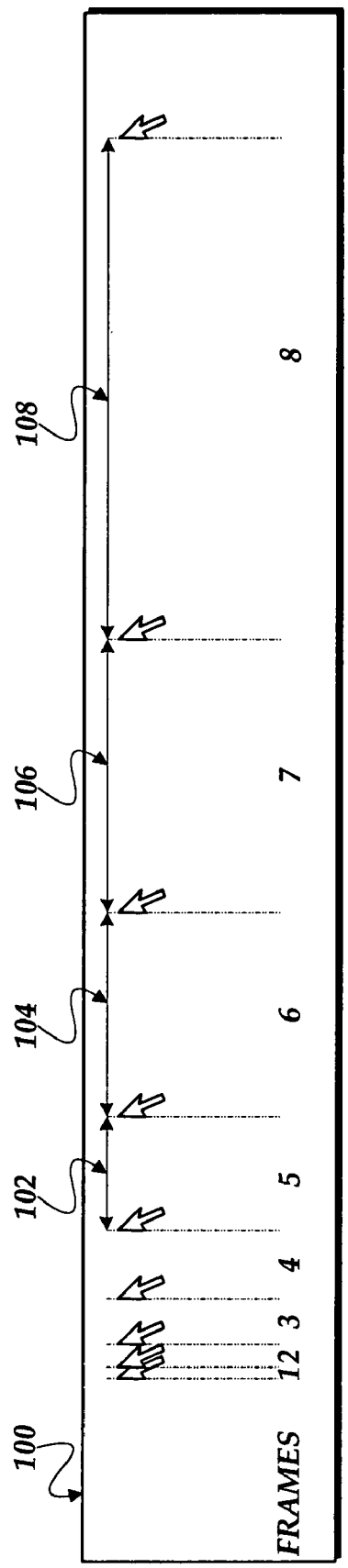
FIG. 1 is a pictorial diagram of an exemplary view for illustrating the gaps that occur between the periodic appearances of the mouse cursor as the speed of the mouse cursor increases, as found in the prior art.
Figure 2:
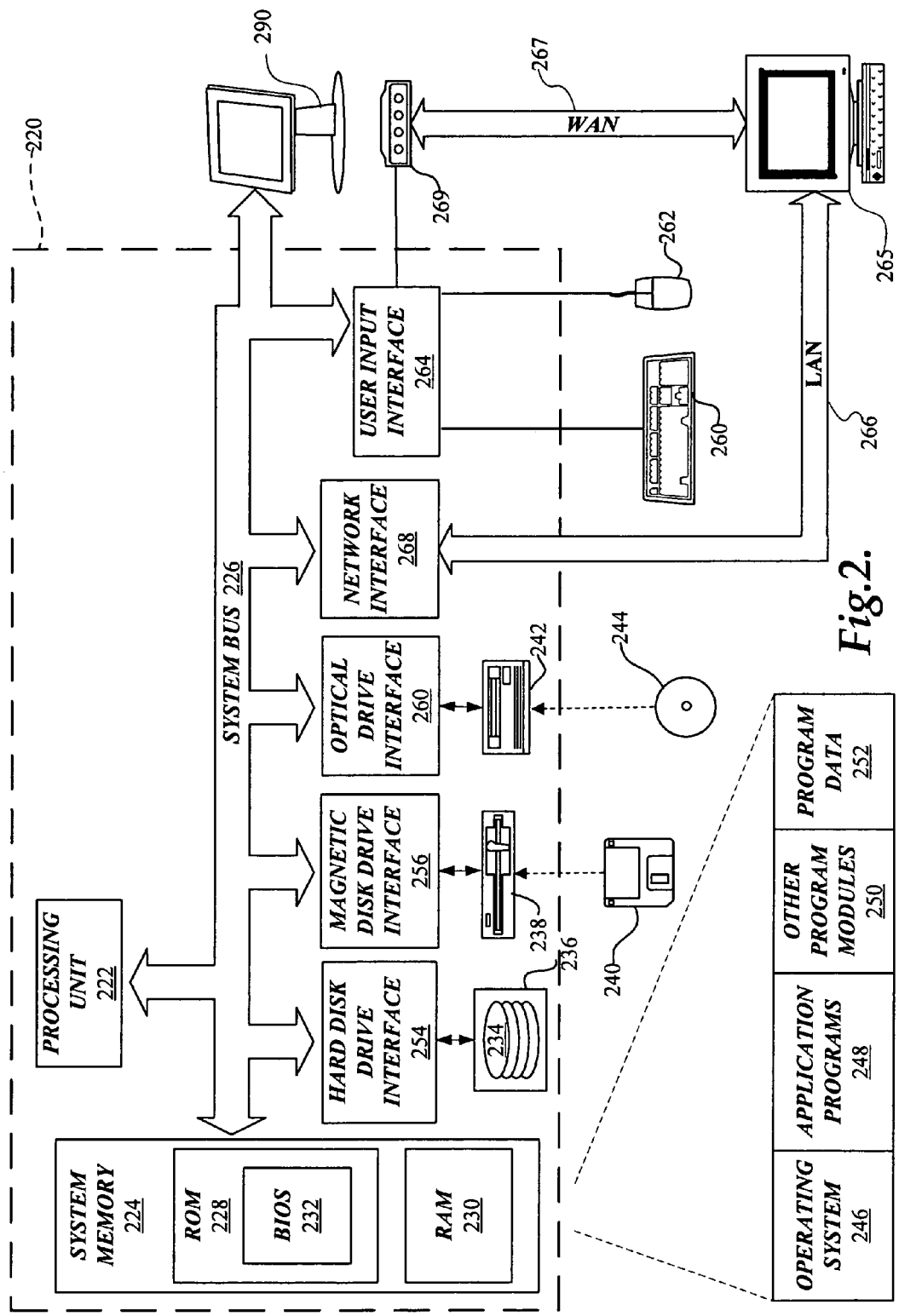
FIG. 2 is a block diagram of a personal computer that provides an exemplary operating environment suitable for implementing aspects of the present invention.

The detailed description which follows is represented largely in terms of processes and symbolic representations of operations by conventional computer components, including a processor, memory storage devices for the processor, connected display devices, and input devices. Furthermore, these processes and operations may utilize conventional computer components in a heterogeneous distributed computing environment, including remote file servers, computer servers, and memory storage devices. Each of these conventional distributed computing components is accessible by the processor via a communications network. FIG. 2 illustrates an example of a suitable computing system environment in which the invention may be implemented. The computing system environment shown in FIG. 2 is only one example of a suitable computing environment and is not intended to suggest any limitation as to the scope of use or functionality of the invention. Furthermore, the illustrated computing environment should not be interpreted as having any dependency requirement relating to any one or a combination of components illustrated in the exemplary operating environment.

The present invention may be advantageously implemented on any number of general purpose or special computing system environments or configurations. Examples of well known computing systems, environments, and/or configurations that may be suitable for implementing the invention include, but are not limited to, personal computers, server computers, laptop devices, multiprocessor systems, microprocessor-based systems, network PCs, mini-computers, mainframe computers, and distributed computing environments that include any of the above systems, or the like.

The invention may be described in the general context of computer-executable instructions, such as program modules, being executed by a computer. Generally, program modules include routines, programs, objects, components, data structures, etc., that perform a particular task or implement particular abstract data types. The invention may also be practiced in distributed computing environments where tasks are performed by remote processing devices that are linked through a communications network. In a distributed computing environment, program modules may be located in both local and remote computer storage media, including memory storage devices.

With reference to FIG. 2, an exemplary system for implementing the invention includes a general purpose computing device in the form of a computer 220. Components of the computer 220 include, but are not limited to, a processing unit 222, a system memory 224, one or more displays 290, and a system bus 226 that couples various system components, including the system memory 224, to the processor 222. The system bus 226 may be any of several types of bus structures including a memory bus or memory controller, a peripheral bus, or a local bus using any of a variety of bus architectures. By way of example and not limitation, such architectures include industry standard architecture ("ISA") bus, microchannel architecture ("MCA") bus, enhanced ISA ("EISA") bus, video electronics standards association ("VESA") local bus, peripheral component interconnect ("PCI") bus, also known as mezzanine bus, and accelerated graphics port ("AGP") bus.

The computer 220 typically includes a variety of computer-readable media. Computer-readable media can be any available media that can be accessed by the computer 220 and include both volatile and non-volatile media and removable and non-removable media.

By way of example and not limitation, computer-readable media may comprise computer storage media and communication media. Computer storage media includes, but is not limited to, RAM, ROM, EEPROM, flash memory or other memory technology, CD-ROM, digital versatile disc ("DVD") or other optical storage, magnetic cassettes, magnetic tape, magnetic disk storage or other magnetic storage devices, or any other medium which can be used to store or communicate the desired information and which can be accessed by the computer 220.

The communication media typically embodies computer-readable instructions, data structures, program modules, or other data in a modulated data signal, such as a carrier wave or other typical transport mechanism, and includes any information delivery media. The term "modulated data signal" means a signal that has one or more of its characteristics set or changed in such a manner as to encode information in the signal. By way of example and not limitation, communication media includes wired media, such as a wired network or direct wired connection, and wireless media, such as acoustic, radio frequency, infrared, and other wireless media. Combinations of any of the above should also be included within the scope of computer-readable media.

The system memory 224 includes computer storage media in the form of volatile and non-volatile memory, such as read only memory ("ROM") 228 and random access memory ("RAM") 230. A basic input/output system ("BIOS") 232 containing basic routines that help to transfer information between elements within the computer 220, such as during startup, is typically stored in ROM 228. RAM 230 typically contains data and/or program modules that are immediately accessible to, and/or presently being operated on, by the processing unit 222. By way of example and not limitation, FIG. 2 illustrates an operating system 246, application programs 248, other program modules 250, and program data 252.

The computer 220 may also include removable/non-removable, volatile/non-volatile computer storage media. By way of example only, FIG. 2 illustrates a hard disk drive 234 that reads from or writes to non-removable, non-volatile magnetic media 236, a magnetic drive 238 that reads from or writes to a removable, non-volatile magnetic disk 240, and an optical drive 242 that reads from or writes to a removable, non-volatile optical disc 244, such as a CD-ROM or other optical media. Other removable/non-removable, volatile/non-volatile computer storage media that can be used in the exemplary operating environment include, but are not limited to, magnetic tape cassettes, flash memory cards, DVDs, digital video tapes, Bernoulli cap cartridges, solid state RAM, solid state ROM, and the like. The hard disk drive 234, magnetic disk drive 238, and optical disc drive 242 may be connected to the system bus 226 by a hard disk drive interface 254, a magnetic disk drive interface 256, and an optical drive interface 258, respectively. Alternatively, hard disk drive 234, magnetic disk drive 238, and optical disc drive 242 may be connected to the system bus 226 by a small computer system interface ("SCSI").

The drives and their associated computer storage media, discussed above and illustrated in FIG. 2, provide storage of computer-readable instructions, data structures, program modules, and other data from the computer 220. In FIG. 2, for example, the hard disk drive 234 may also store the operating system 246, application programs 248, other programs 250, and program data 252. Note that these components can either be the same as or different from the operating system 246, the other program modules 250, and the program data 252. A user may enter commands and information into the computer 220 through an input device, such as keyboard 260 and/or a pointing device 262, commonly referred to as a mouse, a trackball, or a touch pad. Other input devices (not shown) may include a microphone, a joystick, a game pad, a satellite dish, a scanner, or the like. These and other input devices are often connected to the system bus 226 through user input interface 264 and may be connected by other interface and bus structures, such as a parallel port, a serial port, a game port, a universal serial bus ("USB"), or other interface.

The computer 220 may operate in a network environment using logical connections to one or more remote computers 265. The remote computer 265 may be a personal computer, a server, a router, a network PC, a peer device, or other common network node and typically includes many or all the elements described above relative to the computer 220. The logical connections depicted in FIG. 2 include a local area network ("LAN") 266 and a wide area network ("WAN") 267, but may also include other networks. Such network environments are commonplace in offices, enterprise-wide computer networks, intranets, and the Internet.

When used in a LAN network environment, the computer 220 is connected to the LAN 266 through a network interface 268. When using a WAN network environment, the computer typically includes a modem or other means for establishing communication over the WAN, including a network interface 268, over the WAN 267, such as the Internet. The modem 269, which may be internal or external, may be connected to the system bus 226 via the user input interface 264 or other appropriate mechanism. It will be appreciated that the network connections shown are exemplary and that other means of establishing communications between computers may be used. Although many other internal components of the computer 220 are not shown, those of ordinary skill in the art will appreciate that such components and their interconnections are well known. Accordingly, additional details concerning the internal construction of the computer 220 need not be disclosed in connection with the present invention.

Those skilled in the art will understand that program modules, such as the operating system 246, the application programs 248, and the data 252 are provided to the computer 220 via one of its memory storage devices, which may include ROM 228, RAM 230, hard disk 234, magnetic disk drive 238, or optical disc drive 242. The hard disk drive 234 is used to store data 252 and programs, including the operating system 246 and application programs 248.

When the computer 220 is turned on or reset, the BIOS 232, which is stored in ROM, instructs the processing unit 222 to load the operating system 246 from the hard disk drive 234 into the RAM 230. Once the operating system 246 is loaded into RAM 230, the processing unit 222 executes the operating system code and causes the visual elements associated with the user interface of the operating system to be displayed on a monitor. When a program 248 is opened by a user, the program code and relevant data are read from the hard disk drive 234 and stored in RAM 230.

As indicated above, the operations of the present invention relate to enhancing the visibility of mouse cursors or any pointing device cursor in a graphical user interface for a computing device, such as computer 220. The graphical user interface comprises a number of graphics objects corresponding to computer programs and/or controls. According to one aspect of the current invention, the mouse cursor is enhanced with super-sampling cursor images to increase the number of actual mouse cursor images displayed on the screen when the mouse or other pointing device is moved in a rapid manner. Those of ordinary skill in the art and others will appreciate that this is just one manner in which a mouse cursor may be enhanced. Additionally, while the following discussion will be presented in terms of a mouse cursor, as already mentioned, the term "mouse cursor" is used in reference to an iconic pointing image on the computer display. Accordingly, a mouse cursor does not correspond only to an iconic pointing image for a mouse, but to any number of pointing devices, including but not limited to, a touch pad, a trackball, a stylus, a digitizing pad, and the like.

Figure 3:
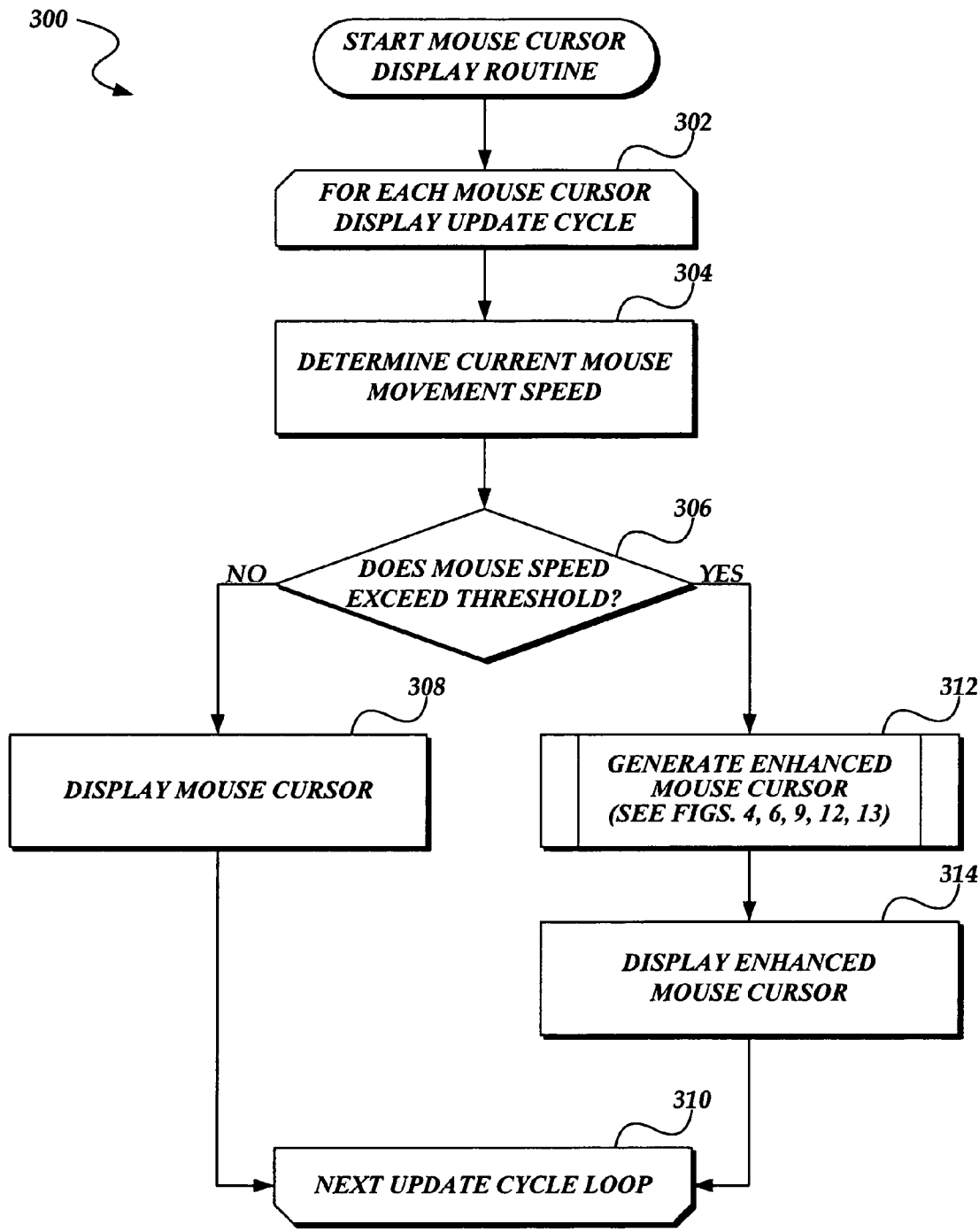
FIG. 3 is a flow diagram illustrating an exemplary routine for processing a mouse cursor display in accordance with aspects of the present invention.

FIG. 3 is a flow diagram illustrating an exemplary routine 300 for processing the display of a mouse cursor in accordance with the present invention. The mouse cursor display processing routine 300 begins at looping block 302 that is repeated for each mouse cursor display update cycle. Thus, on a mouse cursor display update cycle, the routine 300 proceeds to block 304, where the current mouse movement speed is determined.

At decision block 306, a determination is made as to whether the current mouse movement speed exceeds a predetermined threshold speed. According to aspects of the present invention, the mouse cursor display is enhanced only if the current mouse movement speed exceeds the predetermined threshold speed. Thus, if the current mouse movement speed does not exceed the predetermined threshold speed, the routine 300 proceeds to block 308 where the "normal" mouse cursor is displayed on the computer display. Thereafter, the routine 300 proceeds to looping block 310, corresponding to looping block 302, where the process waits for the next mouse cursor display update cycle.

With reference again to decision block 306, if the current mouse movement speed exceeds the predetermined threshold speed, then the routine 300 proceeds to block 312 where an enhanced mouse cursor is generated. As will be described in greater detail in regard to FIGS. 4, 6, 9, 12, and 13 and in accordance with the present invention, the mouse cursor may be enhanced in a variety of manners. After generating the enhanced mouse cursor, at block 314, the enhanced mouse cursor is displayed on the computer display. Thereafter, the routine 300 proceeds to looping block 310, corresponding to looping block 302, where the process waits for the next mouse cursor display update cycle.

Figure 4:
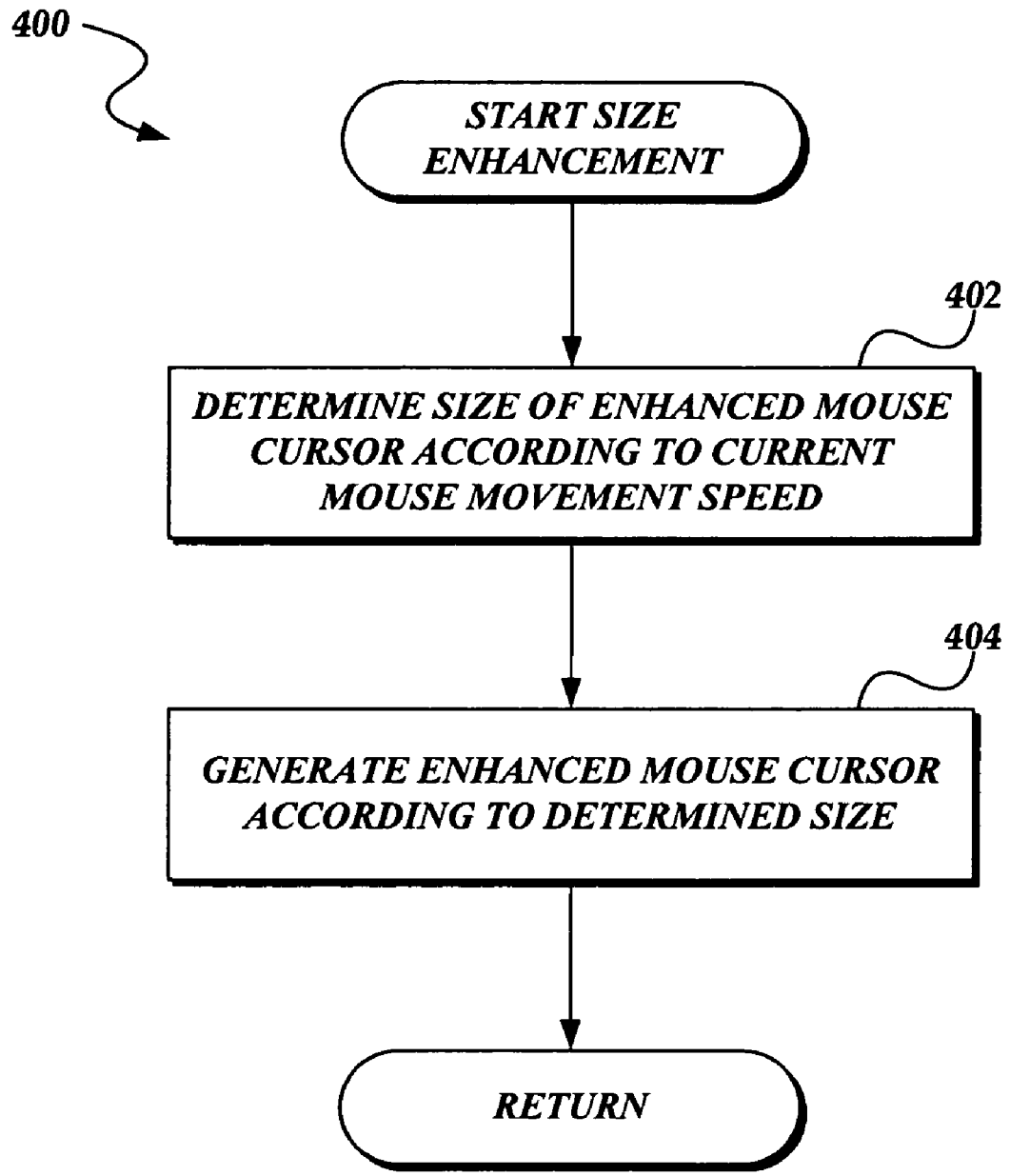
FIG. 4 is a flow diagram illustrating an exemplary mouse cursor enhancement subroutine for enhancing the size of a mouse cursor according to its speed, suitable for use in the routine illustrated in FIG. 3.

As mentioned above, FIGS. 4, 6, 9, 12, and 13 illustrate an exemplary mouse cursor enhancement subroutine suitable for use by the mouse cursor display routine 300 of FIG. 3. In particular, FIG. 4 illustrates a mouse cursor enhancement subroutine 400 that increases the size of the mouse cursor according to the current mouse movement speed. Size-enhanced cursor subroutine 400 begins at block 402 where the enhanced mouse cursor's size is determined according to the current mouse movement speed.

According to aspects of the invention, the above mentioned determination may be made according to a predetermined ratio of enhanced mouse cursor size to mouse movement speed. For example, if the current mouse movement speed is greater than 30 pixels per second, then the enhanced mouse cursor size is increased by 10% over a normal mouse cursor. Additionally, if the current mouse movement speed is greater than 100 pixels per second, then the enhanced mouse cursor size is increased by 50%. According to additional aspects, the amount the enhanced mouse cursor is increased is capped at a predetermined limit, such as a 200% increase over a normal mouse cursor. According to yet further aspects of the present invention, the size of the mouse cursor is determined in a continuous scale, between the normal mouse cursor size and any predetermined limit, according to the speed of the mouse cursor. Furthermore, the sizing of the mouse cursor is immediately reflected in the mouse cursor, i.e., there is no delay as the mouse cursor gradually increases or decreases in size.

After having determined the size of the enhanced mouse cursor, at block 404 the enhanced mouse cursor is generated. Thereafter, the exemplary subroutine 400 returns, and the enhanced mouse cursor is displayed at block 314 (FIG. 3) as described above.

Figure 5:
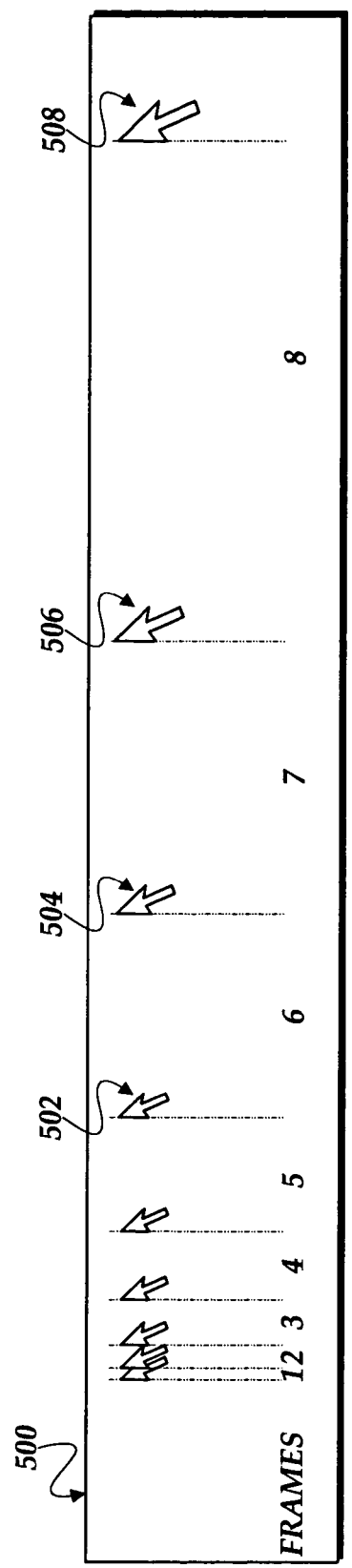
FIG. 5 is a pictorial diagram of an exemplary view for illustrating the mouse cursor enhancement described above in regard to FIG. 4, specifically increasing the mouse cursor size as the speed of the mouse cursor increases.

FIG. 5 is a pictorial diagram of an exemplary view 500 illustrating the mouse cursor enhancement described above in regard to FIG. 4, specifically increasing the mouse cursor size as the speed of the mouse cursor increases. According to the exemplary view 500, after the mouse cursor exceeds a predetermined threshold, the mouse cursor is increased according to its speed, as illustrated by the size-increase mouse cursors 502, 504, 506, and 508.

Figure 6:
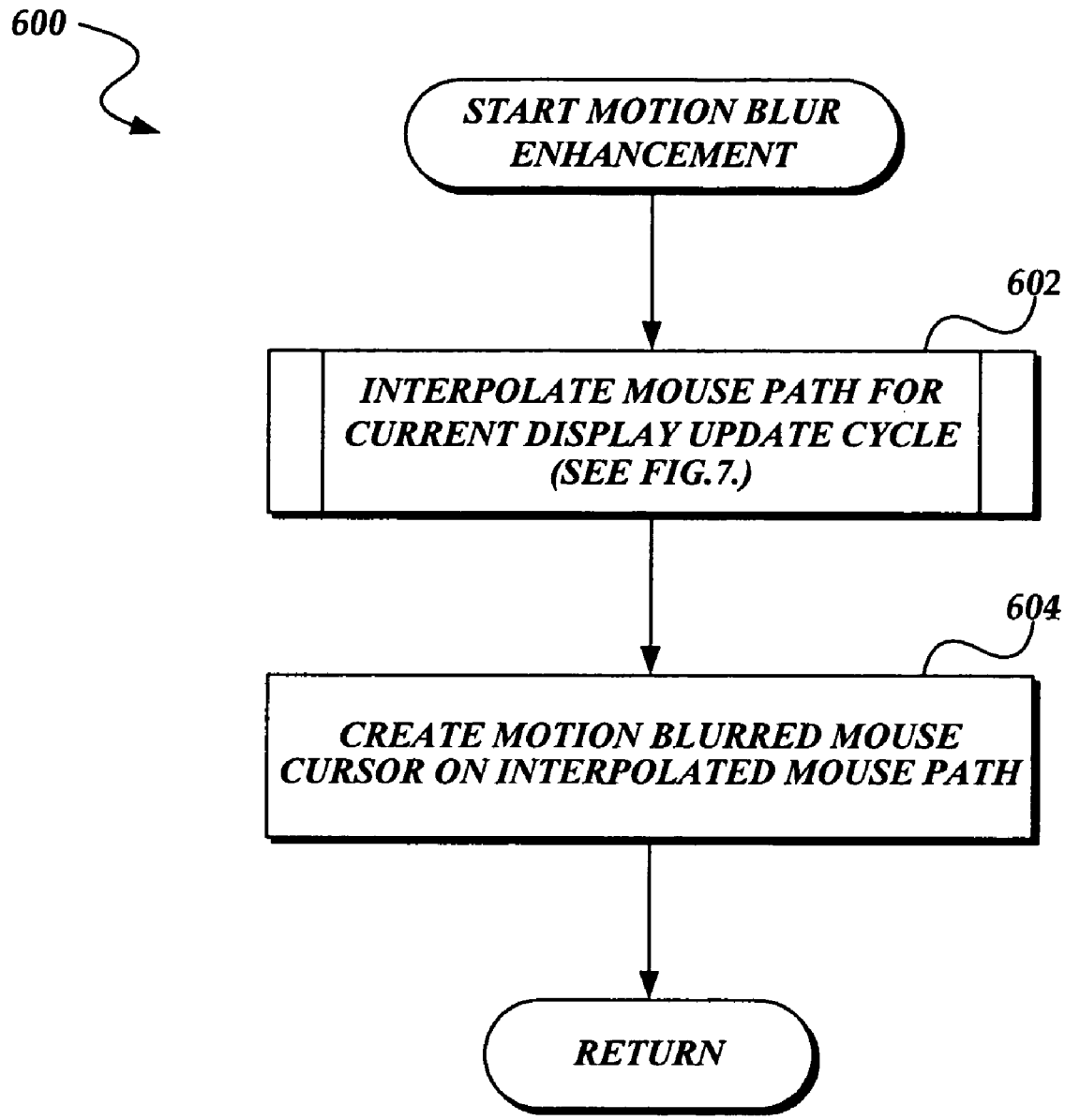
FIG. 6 is a flow diagram illustrating an exemplary mouse cursor enhancement subroutine for enhancing a mouse cursor with motion blur, suitable for use in the routine illustrated in FIG. 3.

FIG. 6 is a flow diagram illustrating an alternative cursor enhancement subroutine, and more particularly, a motion blur enhancement subroutine 600, which, as the name suggests, enhances the mouse cursor by adding motion blur effects to it. As those skilled in the art will appreciate, actual motion blur is the effect noticed by a human eye when an object moves quickly and appears to leave a trail behind it. Unlike the mouse tail mentioned above, the enhanced motion blur stays with the mouse cursor in its current display update cycle and causes no lag.

Beginning at block 602, the current mouse path for the current mouse cursor update cycle is interpolated. The current mouse path is interpolated because information identifying the actual mouse path is unavailable. The actual mouse path information is not available due to the high speed and substantial distance traveled with respect to the mouse cursor update cycle. Even with the high sampling rates of modern pointing devices, it is not always possible to get a sufficient number of mouse cursor positions during a single display update cycle to determine the full path. Thus, by interpolating the current mouse path, an approximate mouse path is determined and the motion blur effect is aligned with the approximate mouse path.

Figure 7:
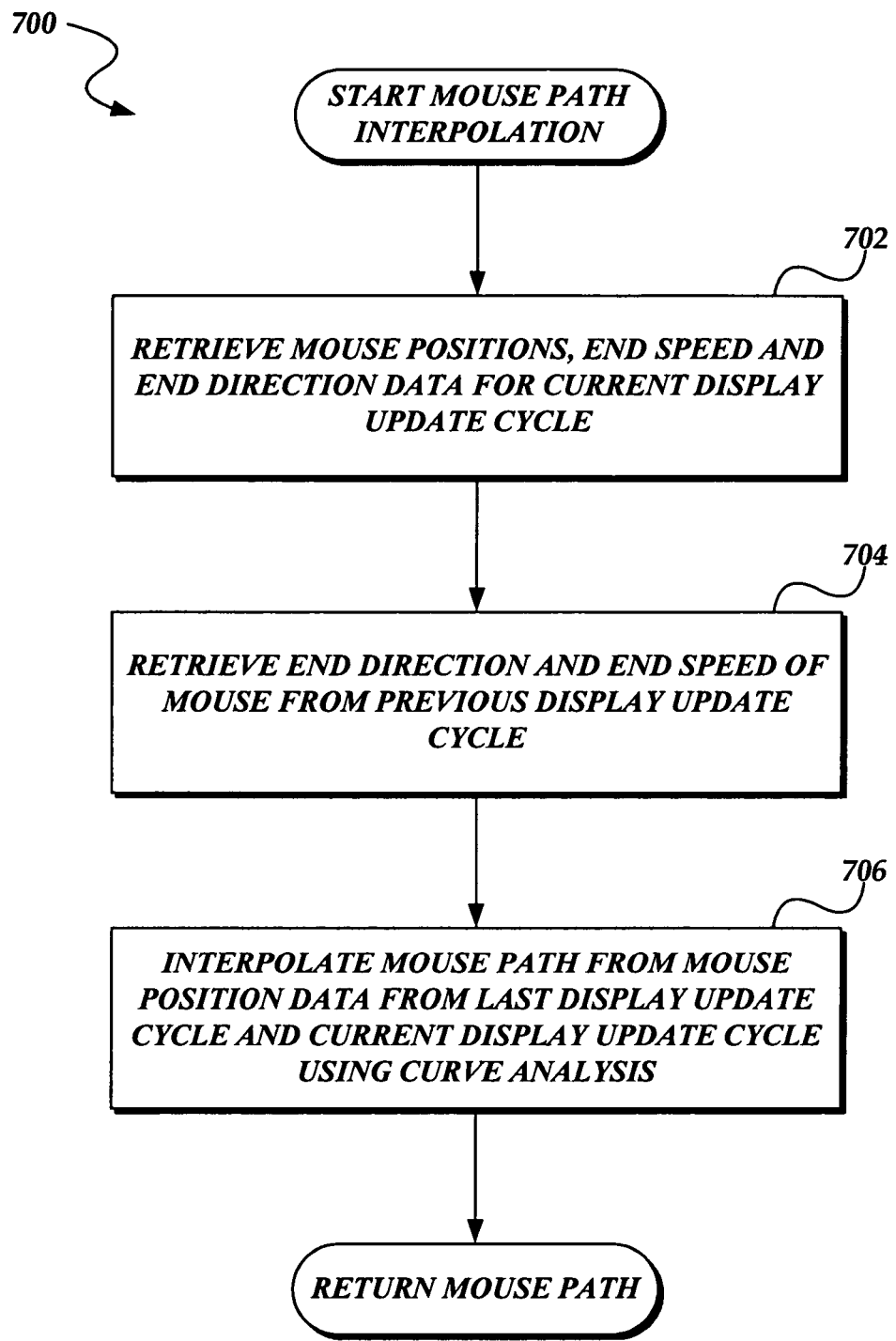
FIG. 7 is a flow diagram illustrating an exemplary mouse path interpolation subroutine for determining an interpolated mouse path given mouse movement data, in accordance with aspects of the present invention.

FIG. 7 is a flow diagram illustrating an exemplary mouse path interpolation subroutine 700 for determining an interpolated mouse path given mouse movement data, suitable for use in the exemplary cursor enhancement subroutine 600 described above. Beginning at block 702, mouse information for the current display update cycle is obtained, including mouse positions read during the update cycle, end speed, and end direction. At block 704, the end direction and end speed of the mouse cursor from the previous display update cycle are obtained.

At block 706, using the current mouse position information and previous mouse position information, a mouse path is interpolated. According to aspects of the present invention, the mouse path is interpolated using a curve analysis or similar processing routine. Those of ordinary skill in the art and others will appreciate that any number of curve analysis routines may be used, including, but not limited to, a spline curve analysis or a Bezier curve analysis. Thereafter, the exemplary subroutine 700 returns the interpolated mouse path to its caller and terminates.

With reference again to FIG. 6, once an interpolated mouse path for the current display update cycle has been determined, at block 604, an enhanced, motion-blurred mouse cursor is created, aligned with the interpolated mouse path. Thereafter, the exemplary subroutine 600 terminates, returning to its calling subroutine.

Figure 8:
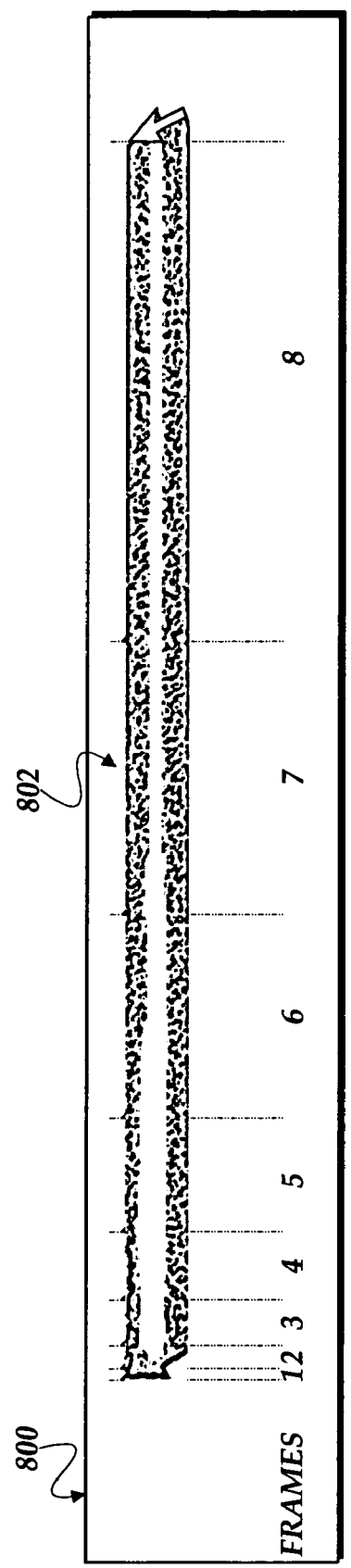
FIG. 8 is a pictorial diagram of an exemplary view illustrating the mouse cursor enhancement described above in regard to FIG. 7, specifically displaying a motion blur effect 942 along a determined mouse path, in accordance with the speed of the mouse cursor.

FIG. 8 is a pictorial diagram of an exemplary view 800 illustrating the mouse cursor enhancement described above in regard to FIG. 6, specifically implementing a motion blur effect 802 along the mouse path, in accordance with the speed of the mouse cursor.

Figure 9:
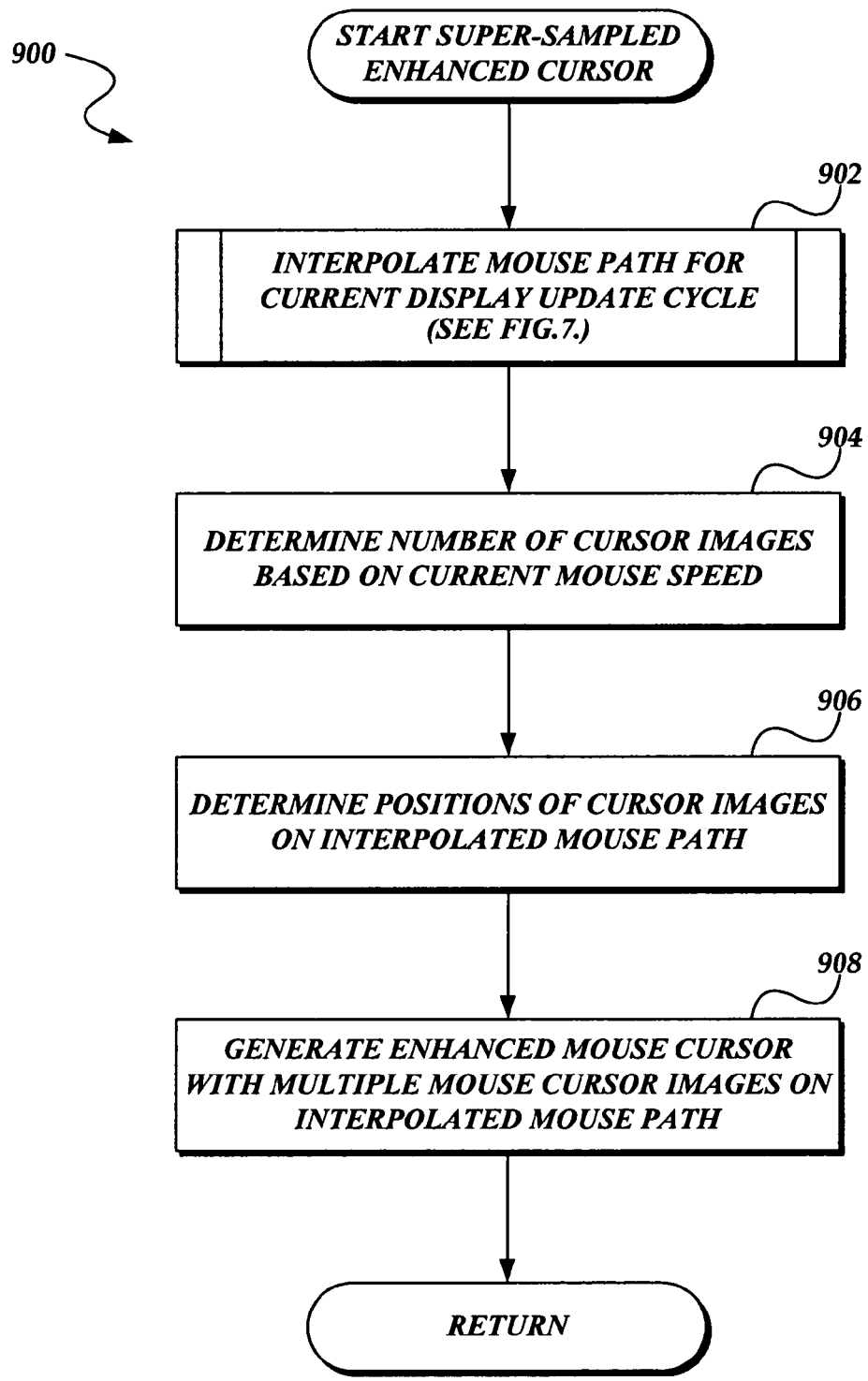
FIG. 9 is a flow diagram illustrating an exemplary mouse cursor enhancement subroutine that enhances a mouse cursor by generating multiple images of the mouse cursor along the mouse path, suitable for use in the routine illustrated in FIG. 3.

FIG. 9 is a flow diagram illustrating yet another exemplary cursor enhancement subroutine 900 that enhances a mouse cursor by super-sampling the path of the mouse cursor, i.e., generating multiple images of the mouse cursor along the mouse path. Beginning at block 902, a current, interpolated mouse path is obtained, as described in regard to subroutine 700 (FIG. 7). Similar to a motion blurred enhanced mouse cursor, a super-sampled enhanced mouse cursor also benefits from an interpolated mouse path for the current display update cycle as the multiple images of the mouse cursor are aligned with the interpolated mouse path.

After obtaining the interpolated mouse path, at block 904, the number of mouse cursor images that should be displayed along the interpolated mouse path is determined. According to one aspect of the present invention, this determination is made according to the current mouse speed. Additionally, the number of mouse cursor images to be displayed on the interpolated mouse path may be configured by a user according to user preferences.

It should be understood that there is a tradeoff brought about by increasing the number of mouse cursor images to be displayed on the interpolated mouse path. In particular, the fewer number of mouse cursor images that are added, the greater the space or gap between the mouse cursor images becomes. Thus, if too few mouse cursor images are inserted, the added mouse cursor images may be insufficient to assist the user in easily locating the current mouse position. Alternatively, if too many mouse cursor images are added, the added mouse cursor images become a distraction, and may obscure potentially important information or targets on the computer desktop.

Those skilled in the art will recognize that many users receive visual cues of the mouse cursor's speed by the spaces left between mouse cursor images. If a uniform distance is used between mouse cursor images, the user might not receive feedback as to increases in current mouse speed. Thus, in accordance with additional aspects of the present invention, the number of mouse cursor images to be added is determined according to a non-linear progression of distances in relation to the current mouse speed along the interpolated mouse path. Using this non-linear distribution, the user is benefited by both the increased mouse cursor images and the visual representation of an elevated mouse speed.

After determining the number of mouse cursor images to be added, at block 906, the positions of the extra mouse cursor images on the interpolated mouse path are determined. At block 908, the enhanced, multiple-image mouse cursor is generated according to the interpolated mouse path. Thereafter, the exemplary subroutine 900 terminates, returning to its calling routine.

Figure 10:
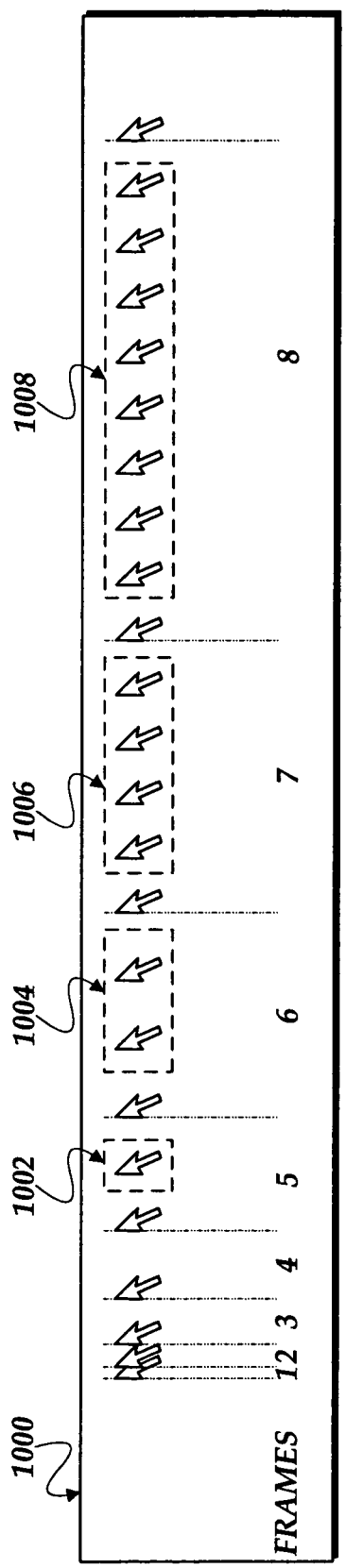
FIG. 10 is a pictorial diagram of an exemplary view illustrating the mouse cursor enhancement described above in regard to FIG. 9, specifically filling the gaps with the super-sampled mouse cursor, according with the speed of the mouse cursor.

FIG. 10 is a pictorial diagram of an exemplary view 1000 illustrating the mouse cursor enhancement described above in regard to FIG. 9, specifically filling the gaps with the super-sampled mouse cursor, according with the speed of the mouse cursor. As shown in the exemplary view 1000, after the mouse cursor speed exceeds a predetermined threshold, multiple mouse cursor images, as illustrated by mouse images 1002, 1004, 1006, and 1008, are displayed in the gaps along the mouse cursor path to provide a more continuous sequence of mouse cursor images.

Figure 11:
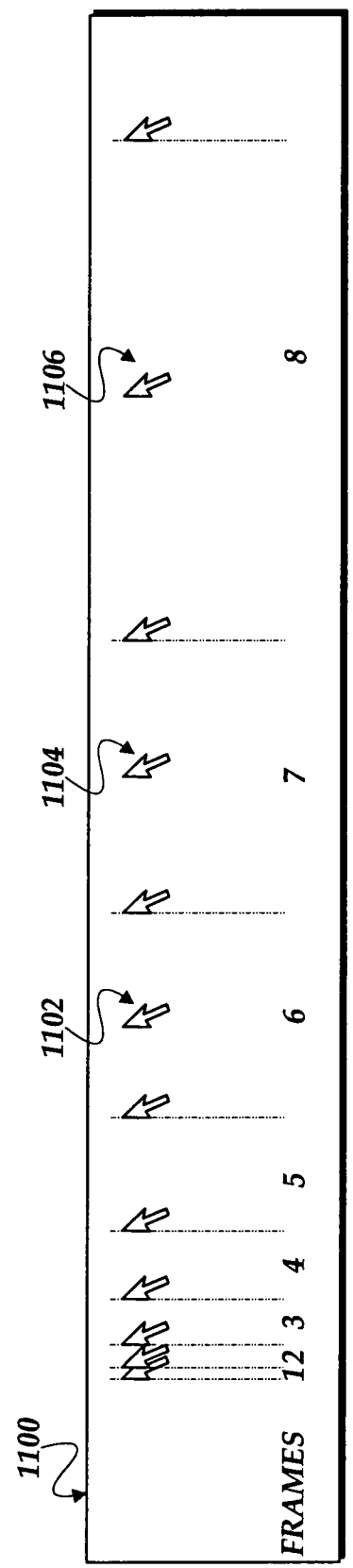
FIG. 11 is a pictorial diagram of an exemplary view illustrating the mouse cursor enhancement described above in regard to FIG. 9, specifically filling the gaps with the super-sampled mouse cursor in a non-linear progression, according with the speed of the mouse cursor.

In contrast to uniform addition of mouse cursor images in the gaps along the mouse cursor path of FIG. 10, FIG. 11 is a pictorial diagram of an exemplary view 1100 illustrating filling in the gaps with a super-sampled mouse cursor in a non-linear progression. Thus, in the exemplary view 1100, fewer mouse cursor images are inserted (in contrast to view 1000 of FIG. 10), and the additional mouse cursor images, images 1102, 1104, and 1106, are distributed in such a fashion as to reflect the increased mouse cursor speed.

Figure 12:
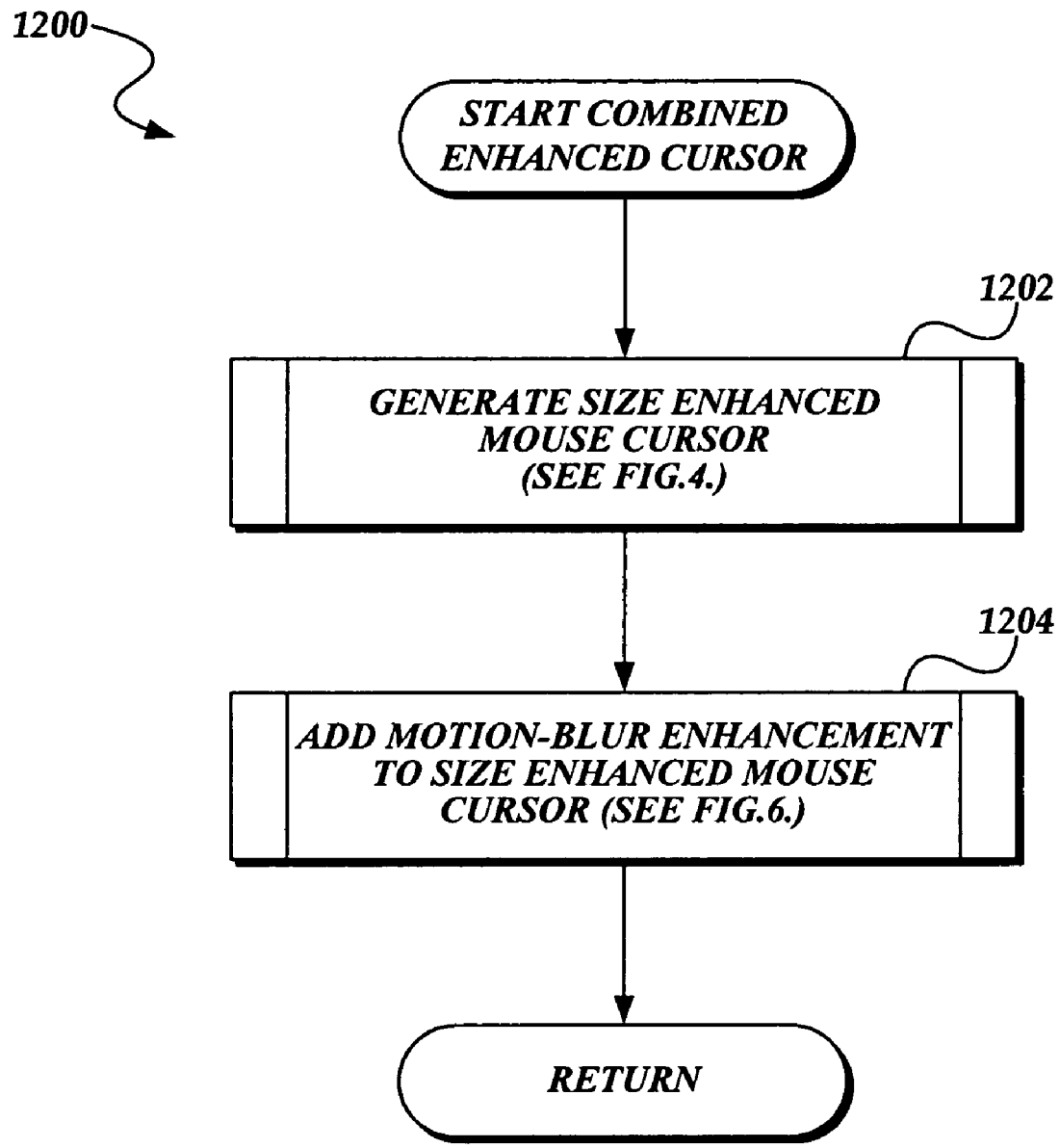
FIG. 12 is a flow diagram illustrating an exemplary combined cursor enhancement subroutine for combining cursor size and motion blur enhancements, suitable for use in the routine illustrated in FIG. 3.
Figure 13:
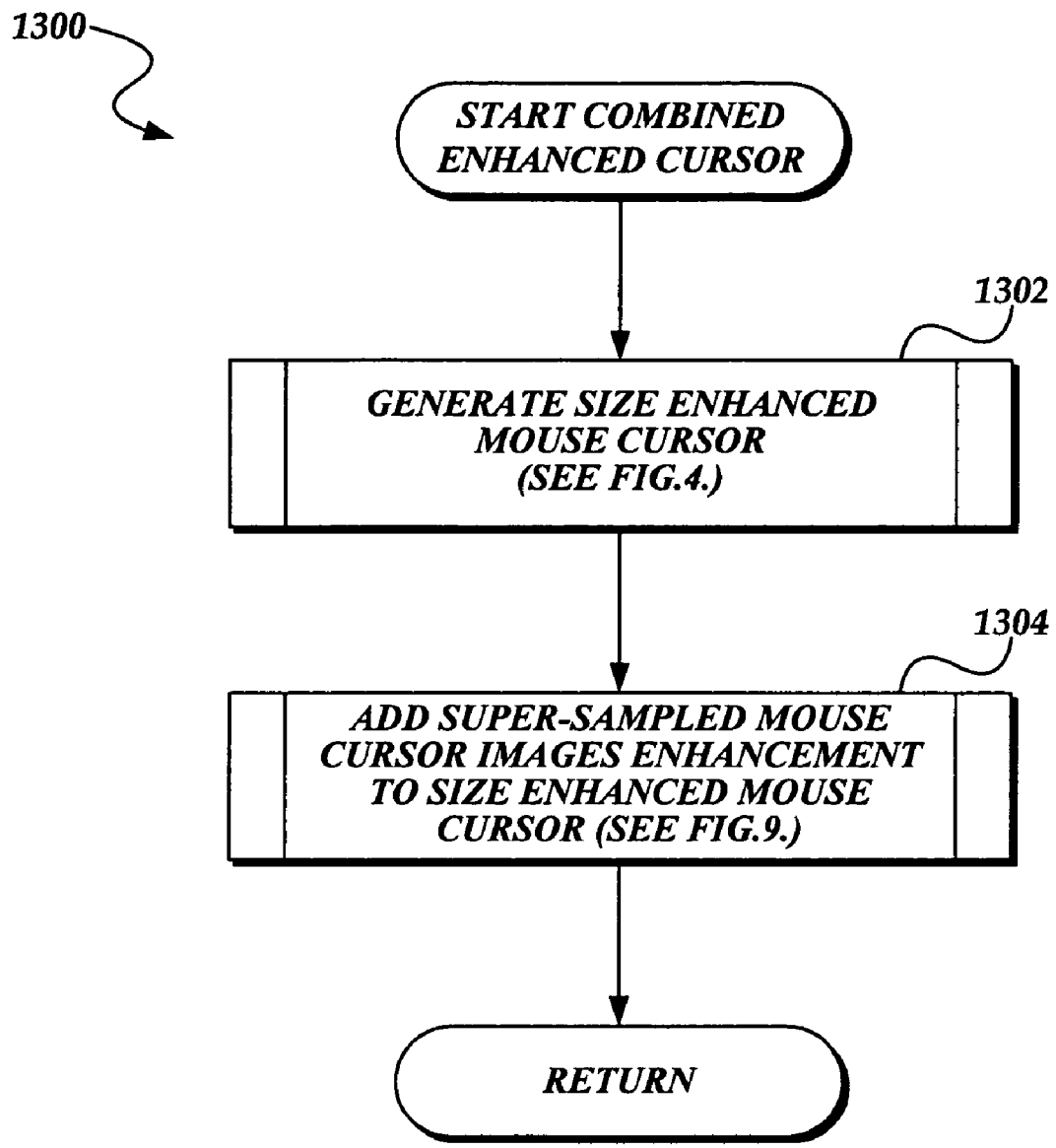
FIG. 13 is a flow diagram illustrating an exemplary cursor enhancement subroutine that combines enhanced cursor size and super-sampled cursor images, suitable for use in the routine illustrated in FIG. 3.

While FIGS. 4, 6, and 9 illustrate discrete manners of enhancing the mouse cursor, they may also be combined in various manners to form additional enhanced mouse cursors. FIGS. 12 and 13 illustrate possible combinations of the mouse cursor enhancements described above. However, those of ordinary skill in the art and others will appreciate that other combinations may be possible, and FIGS. 12 and 13 should likewise be viewed only as representative combinations.

FIG. 12 is a flow diagram illustrating an exemplary mouse cursor enhancement subroutine 1200 combining aspects of enhanced mouse cursor size and motion-blur. Beginning at block 1202, a size enhanced mouse cursor is generated, such as described above in regard to subroutine 400 (FIG. 4). Thereafter, at block 1204, the size enhanced mouse cursor is further enhanced with the motion-blur enhancements described above in regard to subroutine 600 (FIG. 6.) Subsequently, subroutine 1200 terminates, returning to its calling routine.

Similarly, FIG. 13 is a flow diagram illustrating an exemplary mouse cursor enhancement subroutine 1300 combining aspects of enhanced mouse cursor size and super-sampling the mouse cursor. Beginning at block 1302, a size enhanced mouse cursor is generated, such as described above in regard to subroutine 400 (FIG. 4). Thereafter, at block 1204, the size enhanced mouse cursor is further enhanced with super-sampled mouse cursor images, as described above in regard to subroutine 900 (FIG. 9). Subsequently, subroutine 1300 terminates, returning to its calling routine.

The foregoing details as well as other details and many of the attendant advantages of this invention, will become more readily appreciated by those skilled in this art and others by reference to the enclosed attachment. While illustrative embodiments of the invention have been illustrated and described, it will be appreciated that various changes can be made therein without departing from the spirit and scope of the invention.

The embodiments of the invention in which an exclusive property or privilege is claimed are defined as follows:

1. A method for enhancing a mouse cursor displayed on a computer display, the method comprising:
    obtaining a current mouse cursor speed;
    determining whether the current mouse cursor speed exceeds a predetermined threshold, and if so:
        generating a mouse path between an actual current mouse cursor location and an actual previous mouse cursor location;
        determining at least one additional mouse cursor location on the generated mouse path; and
        displaying, for each single frame and within each single frame, a mouse cursor image at each additional determined mouse cursor location on the generated mouse path, in addition to displaying a mouse cursor image at the actual current mouse cursor location and at the actual previous mouse cursor location.

2. The method of claim 1 wherein the mouse cursor image displayed at each additional determined mouse cursor location on the generated mouse path between the actual current and the actual previous mouse cursor locations is an enhanced mouse cursor image on the computer display.

3. The method of claim 2 further comprising sizing the enhanced mouse cursor image as a function of the current mouse cursor speed.

4. The method of claim 2, wherein the at least one additional cursor location is distributed along the mouse path in a non-linear progression according to the mouse cursor speed.

5. A method for enhancing a mouse cursor displayed on a computer display comprising:
    employing a processor executing computer executable instructions stored on a computer readable storage medium to implement the following acts:
    obtaining a current mouse cursor speed;
    determining whether the current mouse cursor speed exceeds a predetermined threshold, and if so:
        generating a mouse path between an actual current mouse cursor location and an actual previous mouse cursor location;
        determining at least one additional mouse cursor location on the generated mouse path; and
        displaying, for each single frame and within each single frame, a mouse cursor image at each additional determined mouse cursor location on the generated mouse path, in addition to displaying a mouse cursor image at the actual current mouse cursor location and at the actual previous mouse cursor location.

6. The method of claim 5 further comprising sizing the mouse cursor image according to the current mouse cursor speed.

7. The method of claim 5 further comprising generating a motion-blur effect for the mouse cursor according to the current mouse cursor speed along the generated mouse path.

8. The method of claim 5, wherein the at least one additional cursor location is distributed along the generated mouse path in a non-linear progression according to the mouse cursor speed.

9. A method for enhancing a mouse cursor displayed on a computer display, the method comprising:
    obtaining mouse cursor information relating to the mouse cursor during the mouse cursor's update display cycle, the mouse cursor information including the mouse cursor's current speed;
    generating a mouse path between an actual current location of the mouse cursor and an actual previous location of the mouse cursor;
    determining at least one additional mouse cursor location on the generated mouth path; and
    displaying, for each single frame and within each single frame, a mouse cursor image at each additional determined mouse cursor location on the generated mouse path, in addition to displaying a mouse cursor image at the actual current mouse cursor location and at the actual previous mouse cursor location.

10. The method of claim 9 further comprising sizing the mouse cursor image according to the mouse cursor's current speed.

11. The method of claim 9, wherein the least one additional cursor location is located on the generated mouse path in a non-linear progression according to the mouse cursor's speed.

12. A method for enhancing a mouse cursor displayed on a computer display, the method comprising:

obtaining a current mouse cursor speed;

determining whether the current mouse cursor speed exceeds a predetermined threshold, and if so:

generating a mouse path between an actual current mouse cursor location and an actual previous mouse cursor location; determining at least one additional mouse cursor location on the generated mouse path; and displaying, for each single frame and within each single frame, a mouse cursor image at each additional determined mouse cursor location on the generated mouse path, in addition to displaying a mouse cursor image at the actual current mouse cursor location and at the actual previous mouse cursor location, wherein the mouse cursor image displayed at each additional determined mouse cursor location on the generated mouse path between the actual current and the actual previous mouse cursor locations is an enhanced mouse cursor image on the computer display.

\* \* \* \* \*